V. V. VEENSCHOTEN.
FEED WATER REGULATOR VALVE.
APPLICATION FILED NOV. 16, 1918.
1,368,978.
Patented Feb. 15, 1921.
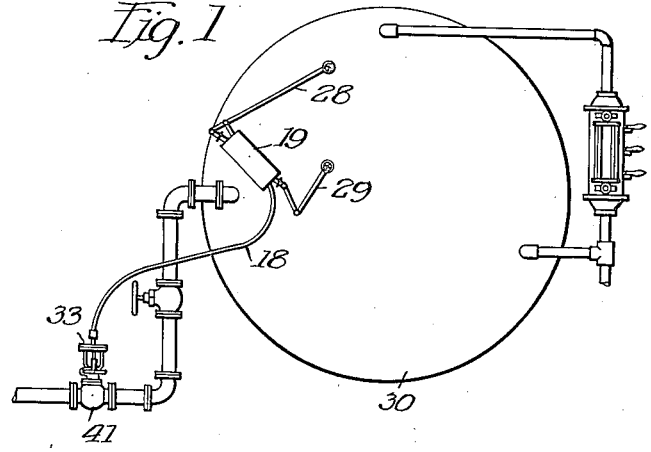
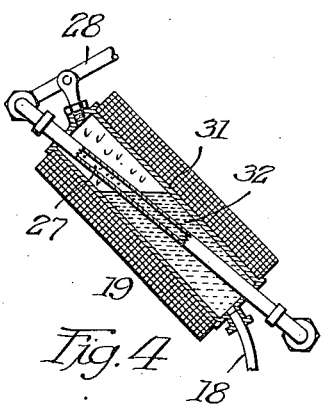
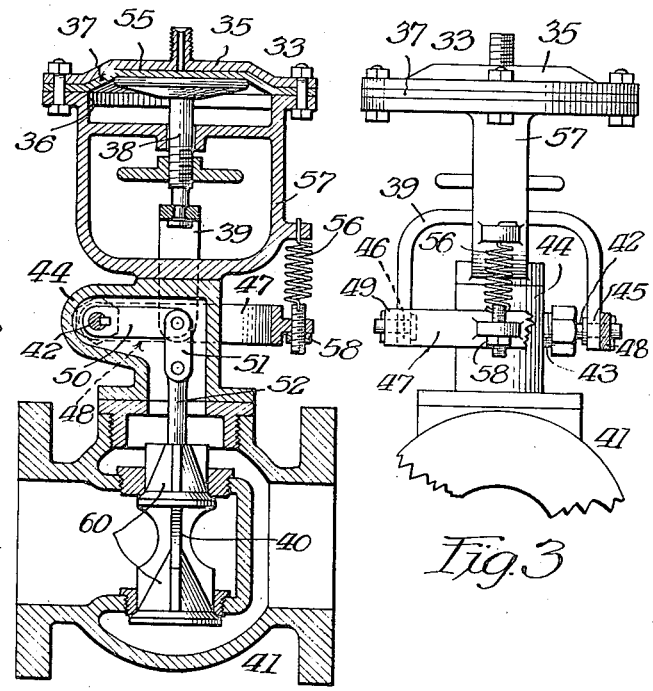
WITNESS:
L. W. Novander.
INVENTOR.
Vincent V. Veenschoten
BY E. J. Andrews
ATTORNEY

UNITED STATES PATENT OFFICE.

VINCENT V. VEENSCHOTEN, OF ERIE, PENNSYLVANIA.

FEED-WATER-REGULATOR VALVE.

1,368,978.   Specification of Letters Patent.   Patented Feb. 15, 1921.

Application filed November 16, 1918. Serial No. 262,781.

*To all whom it may concern:*

Be it known that I, VINCENT V. VEEN-SCHOTEN, a citizen of the United States, residing at Erie, in the county of Erie and State of Pennsylvania, have invented certain new and useful Improvements in Feed-Water-Regulator Valves, of which the following is a specification.

This invention relates to feed-water regulators adapted to operate devices according to the varying pressure of a fluid. In general, the invention has for its object a combination comprising a regulator, which for its operating means, produces a fluid under varying pressures, and also a controller which is affected by the fluid so as to produce a movement of some movable part of the controller depending upon the amount of the fluid pressure applied, the controller being adapted to operate a device according to the movement obtained. The particular object of the invention, in this instance, is to operate a diaphragm controller by means of the varying fluid pressures produced by a boiler feed-water regulator, and to cause this diaphragm in turn to operate a feed-water valve which controls the amount of water passing into the boiler, so that the water-level in the boiler may be suitably regulated thereby.

In the accompanying drawings Figure 1 is an elevation, more or less diagrammatic, of a boiler feed-water regulator system embodying the features of my invention. Fig. 2 is a central sectional view of a diaphragm controller, the feed-water valve and the valve operating means. Fig. 3 is another view of the diaphragm and the valve operating means. Fig. 4 is a central sectional view of the feed-water regulator of the system.

The regulator 19 comprises a tube 27, which is connected, by means of pipes 28 and 29, above and below the water-level in the boiler 30. The tube 27 therefore has more or less steam in its upper end and water in its lower end, depending upon the elevation of the water-level in the boiler. Inclosing this tube 27 is tube 31 partly filled with water 32, and the tube 18 connects the tube 31 with the diaphragm controller 33.

The diaphragm controller is an ordinary type of controller comprising a casing 35 with one side having an opening 36 in which is placed a flexible diaphragm 37; and fixed to this diaphragm is a stem 38 connected to a yoke 39. The diaphragm by means of the yoke 39 is adapted to operate the plunger 40 of the feed-water valve 41, by means of the rotary spindle 42 passing through the stuffing box 43 of the casing 44, the ends 45 and 46 of the yoke 39 being pivoted to a horizontal yoke 47, which in turn has one end 48 fixed to the spindle 42, and the other end 49 pivoted to the opposite side of the casing 44. The spindle 42, which passes into the casing 44 is connected to the plunger 40, by means of an arm 50, a link 51 and a stem 52.

In operation, as the water in the boiler sinks steam will be generated in the tube 31 of the regulator, due to the increasing amount of steam in the tube 27; and the pressure of the steam generated will depend upon the elevation of the water in the tube 27. Thus the pressure of the steam generated, and hence the fluid pressure in the diaphragm chamber 55, will depend more or less on the elevation of the water in the boiler; and this pressure in turn, by means of the diaphragm and the members connecting it with the plunger 40, will determine the position of the plunger; and hence will determine the amount of flow of water to the boiler through the feed-water valve 41. As the pressure in the diaphragm casing increases the valve 41 will open farther, allowing a greater inflow of water into the boiler, and thus increasing the elevation of the water-level not only in the boiler but also in the tube 27, and thus decreasing the steam pressure in the tube 31. As the pressure in the tube 31 decreases the spring 56, fixed to the yoke 47 and also to the diaphragm frame 57, will force the diaphragm upwardly against the steam pressure, and will thus cause the valve 41 to gradually close to the proper position. The tension of the spring 56 may be adjusted by means of the nut 58.

One of the objects of this invention is to produce as sensitive a relation as possible between the water level elevation in the boiler and the amount of opening of the feed-water valve. It is ordinarily desired in practice to have the valve plunger move gradually as the water level elevation varies, and to avoid as much as possible any irregularities of the plunger movement which do not correspond to the ordinary gradual changes in the water level elevation. And it is also desired that this movement of the valve plunger with reference to the level elevation shall be such as to cause the rate of change of the feed-water inflow to lag behind the rate of change of the water outflow from the boiler in the form of steam, so as to produce a variable water-level inversely with the variations of water outflow. For these reasons the valve movement should be as sensitive as possible to variations in water-level.

By the use of the apparatus specified herein the variations in level produce variations in steam pressure in the tube 31 over a range of substantially zero pressure to the maximum amount required to fully open the valve; and, as the pressure thus generated is at times, at least, very low, because of the increased volume required as the diaphragm descends, it is desirable to have the valve plunger operated by slight changes in the steam pressure. This follows the use of the apparatus described because of the use of the spindle rotatably mounted in the stuffing box, together with the diaphragm and the special form of valve used. These elements are so constructed and combined that very little force is required to overcome the resistance to movement, and hence the valve plunger is very sensitive to variations in the steam pressure. This sensitiveness may be varied by varying the size of the diaphragm, or by varying the relative lengths of the arm fixed to the spindle 42. The latter may be effected by adjusting the position of the connections of the two yokes.

It is desirable, frequently, not only to vary the water level elevation inversely as the amount of steam outflow, but also to cause this effect to be less with heavy loads than with light loads, because with heavy loads on the boiler the operation is somewhat more hazardous, especially when accompanied by material variations in water level due to variations in the load. To accomplish this secondary effect the conical members 60 are fixed to the plunger so as to increase the rate of change of the valve opening at a rate greater than the actual rate of movement of the valve. As a consequence of this secondary action, the sensitiveness with which the movements of the valve are affected by the variations in water-level becomes still more important, as any material lack of correspondence between the movement of the valve and the water-level would largely neutralize the effect of this secondary action. Furthermore, the particular shape of the valve port openings, due to the conical members, is such that when the ports are partly open the flow of water therethrough has a much greater tendency to force down the valve than when the ports are closed. Hence, with the operating mechanism set forth, any tendency of the valve stem to stick, such as follows the use of a valve stem reciprocating through a stuffing box, would tend to cause the valve to fly clear open as soon as sufficient force was exerted in the diaphragm to overcome the friction of rest in the stuffing box and to force the valve open.

In use it has been found that the amount of water in the regulator tube 31 continually decreases, and has to be replaced periodically; so that the water-level in the tube may vary greatly, and hence is often a very material distance below the water-level in the tube 27, when the latter level is high, although in practice it should be above the latter level. These irregularities materially affect the steam pressure generated in the tube 31 under similar conditions, and hence the need of great sensitiveness between the boiler water-level variations, and the valve plunger movement is emphasized; because while, with high level in the tube 31 there might be ample steam pressure generated therein to overcome a sticking valve stem, yet with low water-level in the tube 31 the steam pressure therein would increase but very slightly as the water-level in the boiler sank, and would not, in some cases, be sufficient to move the plunger before injury to the boiler resulted. This tendency is much increased by the fact that as the water-level in the boiler sinks the water in the tubes 18 and 31 is forced down into the diaphragm chamber, and hence the water-level in the tube 31 sinks materially lower and this has a tendency to neutralize the effect on the steam pressure generated of the decreased level of the water in the tube 27. In fact the only increased pressure effect, if any, is due to a slight heating of the steam; as no additional steam otherwise can be generated when the water-level in the tube 27 is above that in the tube 31.

I claim as my invention:

1. The combination of a diaphragm casing, a diaphragm in said casing, a boiler feed-water valve; means operatively connecting said diaphragm with said valve, said means comprising a spindle rotatably mounted in the casing of said valve; a yoke with one end fixed to said spindle and the other pivoted to said casing, a second yoke with its end pivoted respectively to the opposite sides of the first mentioned yoke, and means connecting said second yoke with said diaphragm; one end of said spindle extending into said valve casing, and means connecting said spindle with said valve.

2. In a boiler feed-water system the combination of a diaphragm casing, a diaphragm mounted in said casing, a feed-water valve, a spindle rotatably mounted in the casing of said valve with one end extending outwardly and the other end extending inwardly, an arm fixed to each of said ends, one of said arms being operatively connected to said diaphragm and the other arm being operatively connected to the feed-water valve in said casing, and resilient means connected with said first mentioned arm tending to rotate said spindle to close said valve.

In testimony whereof, I hereunto set my hand.

VINCENT V. VEENSCHOTEN.